US009336004B2

(12) United States Patent  King (10) Patent No.: US 9,336,004 B2
(45) Date of Patent: May 10, 2016

(54) CHECKPOINTING REGISTERS FOR TRANSACTIONAL MEMORY

(71) Applicant: ADVANCED MICRO DEVICES, INC., Sunnyvale, CA (US)

(72) Inventor: John M. King, Austin, TX (US)

(73) Assignee: Advanced Micro Devices, Inc., Sunnyvale, CA (US)

(*) Notice: Subject to any disclaimer, the term of this patent is extended or adjusted under 35 U.S.C. 154(b) by 579 days.

(21) Appl. No.: 13/781,403

(22) Filed: Feb. 28, 2013

(65) Prior Publication Data

US 2014/0244978 A1   Aug. 28, 2014

(51) Int. Cl.
*G06F 9/30* (2006.01)
*G06F 9/38* (2006.01)

(52) U.S. Cl.
CPC ............ *G06F 9/384* (2013.01); *G06F 9/30098* (2013.01); *G06F 9/3857* (2013.01); *G06F 9/3863* (2013.01)

(58) Field of Classification Search
None
See application file for complete search history.

(56) References Cited

U.S. PATENT DOCUMENTS

| 5,535,346 | A * | 7/1996 | Thomas, Jr. | G06F 9/3836 712/217 |
| 5,996,068 | A * | 11/1999 | Dwyer, III | G06F 9/3851 712/217 |
| 7,698,537 | B2 * | 4/2010 | Airaud | G06F 9/3836 712/218 |
| 7,739,065 | B1 * | 6/2010 | Lee | G01R 31/2894 702/117 |
| 8,583,901 | B2 * | 11/2013 | Zhu | G06F 9/3012 712/216 |
| 9,015,450 | B2 * | 4/2015 | Sun | G06F 9/384 712/217 |
| 9,063,747 | B2 * | 6/2015 | Tran | G06F 9/30116 |
| 9,170,818 | B2 * | 10/2015 | Tran | G06F 9/3838 |
| 2002/0035677 | A1 * | 3/2002 | Sheaffer | G06F 9/3836 712/217 |
| 2003/0135714 | A1 * | 7/2003 | Sheaffer | G06F 9/3836 712/217 |
| 2004/0230778 | A1 * | 11/2004 | Chou | G06F 9/384 712/228 |
| 2010/0140749 | A1 * | 6/2010 | Kuo | H01L 23/481 257/621 |
| 2010/0153662 | A1 * | 6/2010 | Vick | G06F 8/52 711/154 |
| 2010/0153690 | A1 * | 6/2010 | Vick | G06F 9/30123 712/217 |
| 2010/0153776 | A1 * | 6/2010 | Vick | G06F 9/30123 714/15 |
| 2010/0217945 | A1 * | 8/2010 | Ge | G06F 9/30105 711/156 |
| 2011/0012258 | A1 * | 1/2011 | Omandam | B23K 26/0042 257/737 |
| 2012/0005461 | A1 * | 1/2012 | Moir | G06F 9/3857 712/228 |
| 2014/0040595 | A1 * | 2/2014 | Tran | G06F 9/384 712/32 |
| 2014/0156933 | A1 * | 6/2014 | Shaikh | G06F 12/0875 711/123 |
| 2015/0026437 | A1 * | 1/2015 | Achenbach | G06F 9/384 712/216 |

OTHER PUBLICATIONS

'The Alpha 21264 Microprocessor Architecture' by R. E. Kessler et al., International Conference on Computer Design: VLSI in Computers and Processors, 1998.*
'On the Latency and Energy of Checkpointed Superscalar Register Alias Tables' by Elham Safi et al., IEEE Transactions on Very Large Scale Integration (VLSI) Systems, vol. 18, No. 3, March 2010.*
'Two-Stage, Pipelined Register Renaming' by Elham Safi et al., IEEE Transactions on Very Large Scale Integration (VLSI) Systems, vol. 19, No. 10, October 2011.*

* cited by examiner

*Primary Examiner* — Steven Snyder (57) ABSTRACT

The present invention provides a method and apparatus for checkpointing registers for transactional memory. Some embodiments of the apparatus include first rename logic configured to map up to a predetermined number of architectural registers to corresponding first physical registers that hold first values associated with the architectural registers. The mapping is responsive to a transaction modifying one or more of the first values associated with the architectural registers. Some embodiments of the apparatus also include microcode configured to write contents of the first physical registers to a memory in response to the transaction modifying first values associated with a number of the architectural registers that is larger than the predetermined number.

20 Claims, 9 Drawing Sheets

CHECKPOINTING REGISTERS FOR TRANSACTIONAL MEMORY

BACKGROUND

This application relates generally to processing systems, and, more particularly, to checkpointing registers for transactional memory in processing systems.

Conventional processor-based systems typically include one or more processing elements such as a central processing unit (CPU), a graphical processing unit (GPU), an accelerated processing unit (APU), and the like. The processing units include one or more processor cores that are configured to access instructions or data that are stored in a main memory and then execute the instructions or manipulate the data. The state of the processing units or the processor cores can be defined, at least in part, by values stored in a set of architectural registers. For example, instruction set architectures (ISA) may support a set of named architectural (or microarchitectural) registers that can be used in software created for the machine. The set of architectural registers may include 48 registers: 16 integer registers and 32 floating-point registers.

The processing units or processor cores also implement a set of physical registers in a physical register file. The physical registers may be used to store different types of information during operation of the processing unit or processor cores. For example, physical registers may be used to store data for in-flight operations until this data is committed to the state of the machine. The architectural registers can be mapped to the physical registers in the physical register file, e.g., using renaming logic that maps the name of the architectural register to a physical register number that identifies a physical register. In operation, the physical registers can be allocated to in-flight operations or architectural registers as needed, depending on the availability of the physical registers in the physical register file.

Transactional memory is implemented in computer architectures that support parallel programming. Programmers can define a group of instructions as a transaction and the instructions in the transaction are executed in an atomic and isolated way. Instructions in an atomic transaction are executed as a block with respect to all other concurrent execution threads. The instructions in a transaction are isolated so that intermediate results produced by the transaction are not exposed to the rest of the system until the transaction completes. However, transactions do not always successfully complete and may be aborted before completion. In these cases, the state of the machine is rolled back to a state corresponding to a checkpoint that is defined for the transaction. A transaction checkpoint may be defined, at least in part, by the state of registers in the machine prior to executing instructions in the transaction. The register state may be defined by the values stored in architectural registers, physical registers, or a rename file that indicates the relations between the architectural and physical registers.

SUMMARY OF EMBODIMENTS

The following presents a simplified summary of the disclosed subject matter in order to provide a basic understanding of some aspects of the disclosed subject matter. This summary is not an exhaustive overview of the disclosed subject matter. It is not intended to identify key or critical elements of the disclosed subject matter or to delineate the scope of the disclosed subject matter. Its sole purpose is to present some concepts in a simplified form as a prelude to the more detailed description that is discussed later.

Checkpointing the register state of a processing device can consume significant amounts of machine resources or processing overhead. For example, conventional transactional memory usually defines the architectural register set of the machine as the state that must be rolled back on a transaction abort. One method for checkpointing registers at the beginning of the transaction is to write values in the architectural registers to a private memory. Checkpointing to private memory is a straightforward operation and does not require allocating physical registers to hold the checkpoint register values. However, checkpointing to private memory requires significant upfront latency to perform the necessary write operations. For example, writing 48 architectural registers to private memory may require approximately 50-100 cycles, which can significantly reduce performance for transactions that are relatively short, e.g., less than 50 cycles.

Alternatively, an additional rename table may be implemented (e.g., in hardware) to map checkpointed values of architectural registers to physical registers in a physical register file. For example, the checkpoint rename table may be used to map modified architectural registers to a physical register that includes the checkpointed value, while the existing rename table is used to map the modified architectural register to a physical register that includes the modified value. This approach may be faster than writing the entire register state to private memory, but it requires allocating additional physical registers to hold the checkpointed values. Thus, if the transaction modifies a large number of registers, a correspondingly large number of physical registers need to be allocated for storing the checkpointed values, which may adversely affect performance by leaving fewer physical registers available for in-flight instructions. This also may require building a larger physical register file to achieve acceptable performance on transactions which modify a large number of architectural registers.

The disclosed subject matter is directed to addressing the effects of one or more of the problems set forth above.

In some embodiments, an apparatus is provided for checkpointing registers for transactional memory. Some embodiments of the apparatus include first rename logic configured to map up to a predetermined number of architectural registers to corresponding first physical registers that hold first values associated with the architectural registers. The mapping is responsive to a transaction modifying one or more of the first values associated with the architectural registers. Some embodiments of the apparatus also include microcode configured to write contents of the first physical registers to a memory in response to the transaction modifying first values associated with a number of the architectural registers that is larger than the predetermined number.

In some embodiments, a method is provided for checkpointing registers for transactional memory. Some embodiments of the method include mapping up to a predetermined number of architectural registers to corresponding first physical registers that hold first values associated with the architectural registers. The mapping is responsive to a transaction modifying one or more of the first values associated with the architectural registers. Some embodiments of the method also include writing contents of the first physical registers to a memory in response to the transaction modifying first values associated with a number of the architectural registers that is larger than the predetermined number.

BRIEF DESCRIPTION OF THE DRAWINGS

The disclosed subject matter may be understood by reference to the following description taken in conjunction with the accompanying drawings, in which like reference numerals identify like elements, and in which.

While the disclosed subject matter may be modified and may take alternative forms, specific embodiments thereof have been shown by way of example in the drawings and are herein described in detail. It should be understood, however, that the description herein of specific embodiments is not intended to limit the disclosed subject matter to the particular forms disclosed, but on the contrary, the intention is to cover all modifications, equivalents, and alternatives falling within the scope of the appended claims.

DETAILED DESCRIPTION

Illustrative embodiments are described below. In the interest of clarity, not all features of an actual implementation are described in this specification. It should be appreciated that in the development of any such actual embodiment, numerous implementation-specific decisions should be made, which may vary from one implementation to another. Moreover, it should be appreciated that such a development effort might be complex and time-consuming, but would nevertheless be a routine undertaking for those of ordinary skill in the art having the benefit of this disclosure. The description and drawings merely illustrate the principles of the claimed subject matter. It should thus be appreciated that those skilled in the art may be able to devise various arrangements that, although not explicitly described or shown herein, embody the principles described herein and may be included within the scope of the claimed subject matter. Furthermore, all examples recited herein are principally intended to be for pedagogical purposes to aid the reader in understanding the principles of the claimed subject matter and the concepts contributed by the inventor(s) to furthering the art, and are to be construed as being without limitation to such specifically recited examples and conditions.

The disclosed subject matter is described with reference to the attached figures. Various structures, systems and devices are schematically depicted in the drawings for purposes of explanation only and so as to not obscure the description with details that are well known to those skilled in the art. Nevertheless, the attached drawings are included to describe and explain illustrative examples of the disclosed subject matter. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition is expressly set forth in the specification in a definitional manner that directly and unequivocally provides the special definition for the term or phrase. Additionally, the term, "or," as used herein, refers to a non-exclusive "or," unless otherwise indicated (e.g., "or else" or "or in the alternative"). Also, the various embodiments described herein are not necessarily mutually exclusive, as some embodiments can be combined with one or more other embodiments to form new embodiments.

As discussed herein, checkpointing the register state of a processing device can consume significant amounts of device resources or processing overhead. Some embodiments described herein may therefore implement rename logic that can be used to map a predetermined, small number of architectural registers to corresponding physical registers that hold previous values of the architectural registers in response to a transaction modifying one or more values of one or more architectural registers. For example, the rename logic may be configured to map eight architectural registers to corresponding physical registers. A controller monitors the number of mapped architectural registers in the rename logic and triggers a microcode routine to write the values in the corresponding physical registers to a private memory in response to a number of architectural registers modified by the transaction exceeding the predetermined number. The microcode routine may also free the physical registers used to store the previous values of the architectural registers. An architectural register file (ARF) may be used to map the architectural registers to physical registers and some embodiments of the ARF can be extended with one additional bit per architectural register that indicates which architectural registers have been checkpointed already and therefore do not require a new checkpoint. If this "checkpointed" bit is set, that architectural register either has been checkpointed in the checkpoint logic or has been saved to private memory. This allows the controller to determine when to add a register to a checkpoint table that may be implemented as part of the rename logic.

Some embodiments of the controller may instruct the microcode routine to write the entire architectural register set associated with the processing device to a memory (such as a private memory or emulation memory implemented in a processor core of the processing device) in response to the number of architectural registers modified by the transaction exceeding the predetermined number. From that point forward, the entire checkpointed register state is available from the private memory and no physical registers need to remain allocated to hold the checkpointed values. The controller would set all the "checkpointed" bits in embodiments of the ARF that use these bits to indicate previously checkpointed registers. Checkpointing the entire register state in this manner improves performance for transactions that modify a large number of architectural registers. Other embodiments of the controller may instruct the microcode routine to only write those register values that are currently mapped by the rename logic to the private memory in response to the number of architectural registers modified by the transaction exceeding the predetermined number. The "checkpointed" bits that correspond to the registers that were written to private memory remain set in the ARF and all other "checkpointed" bits remain clear. The controller may reuse the rename logic to map a new set of architectural registers to the physical registers that store previous values of the architectural registers in response to subsequent modifications of the architectural registers by the transaction. The controller may later invoke the microcode routine to write this new set of register values to the private memory, e.g., in response to the number of architectural registers modified by the transaction again exceeding the predetermined number.

Figure 1:
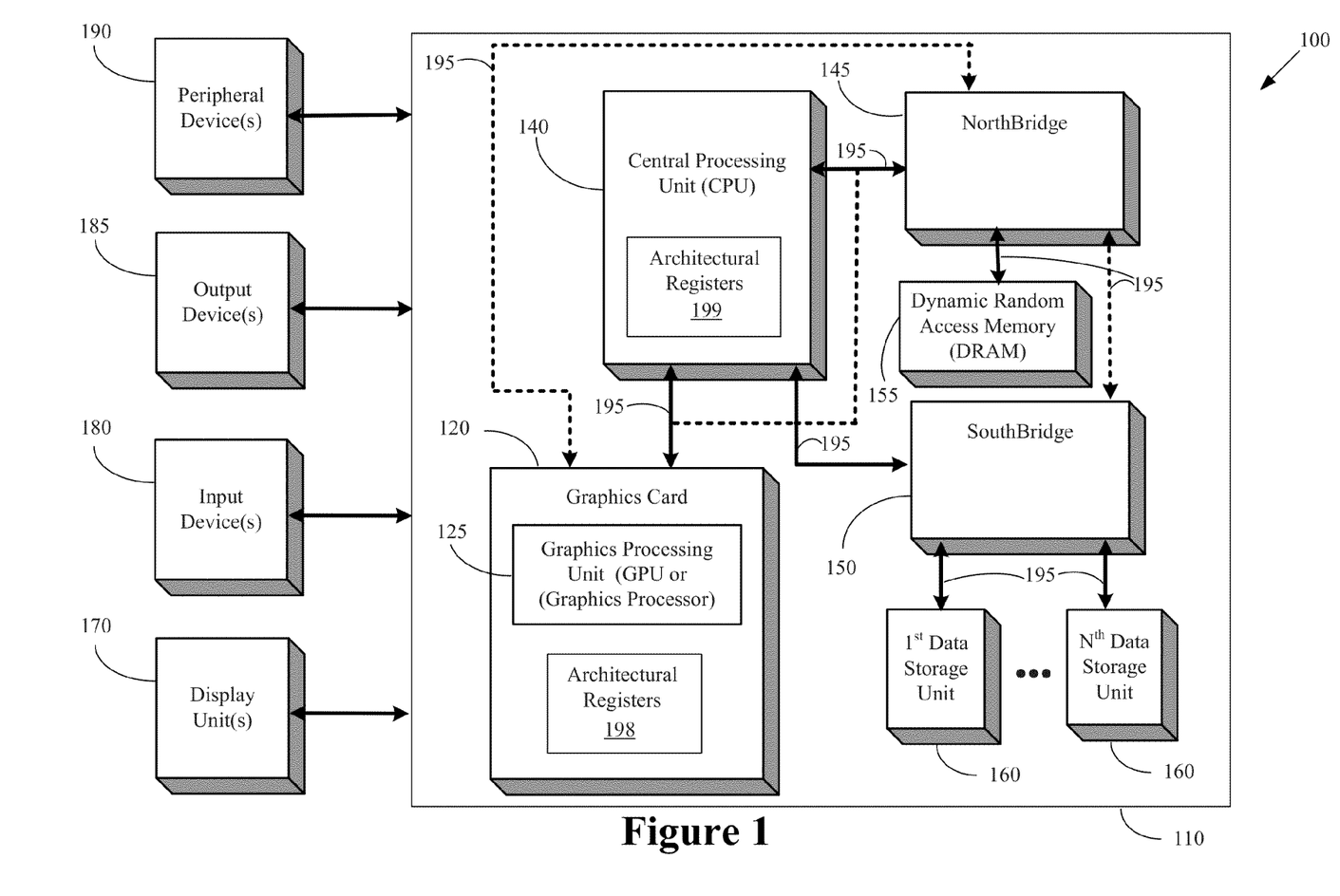
FIG. 1 conceptually illustrates a first example of a computer system, in accordance with some embodiments.

FIG. 1 conceptually illustrates a computer system 100, according to some embodiments. The computer system 100 may be a personal computer, a laptop computer, a handheld computer, a netbook computer, a mobile device, a tablet computer, a netbook, an ultrabook, a telephone, a personal data assistant (PDA), a server, a mainframe, a work terminal, a smart television, or the like. The computer system includes a main structure 110 which may be a computer motherboard, system-on-a-chip, circuit board or printed circuit board, a desktop computer enclosure or tower, a laptop computer base, a server enclosure, part of a mobile device, tablet, personal data assistant (PDA), or the like. The computer system 100 may run an operating system such as Linux®, Unix®, Windows®, Mac OS®, or the like.

In some embodiments, the main structure 110 includes a graphics card 120. For example, the graphics card 120 may be an ATI Radeon™ graphics card from Advanced Micro Devices ("AMD"). The graphics card 120 may, in different embodiments, be connected on a Peripheral Component Interconnect (PCI) Bus (not shown), PCI-Express Bus (not shown), an Accelerated Graphics Port (AGP) Bus (also not shown), or other electronic or communicative connection. The graphics card 120 may include a graphics processing unit (GPU) 125 used in processing graphics data. The graphics card 120 may be referred to as a circuit board or a printed circuit board or a daughter card or the like.

The computer system 100 shown in FIG. 1 also includes a central processing unit (CPU) 140, which is electronically or communicatively coupled to a northbridge 145. The CPU 140 and northbridge 145 may be housed on the motherboard (not shown) or some other structure of the computer system 100. In some embodiments, the graphics card 120 may be coupled to the CPU 140 via the northbridge 145 or some other electronic or communicative connection. For example, CPU 140, northbridge 145, GPU 125 may be included in a single package or as part of a single die or "chip". The northbridge 145 may be coupled to a system RAM (or DRAM) 155 or the system RAM 155 may be coupled directly to the CPU 140. The system RAM 155 may be of any RAM type known in the art; the type of system RAM 155 may be a matter of design choice. The northbridge 145 may be connected to a southbridge 150. The northbridge 145 and southbridge 150 may be on the same chip in the computer system 100, or the northbridge 145 and southbridge 150 may be on different chips. The southbridge 150 may be connected to one or more data storage units 160. The data storage units 160 may be hard drives, solid state drives, magnetic tape, or any other non-transitory, writable media used for storing data. In various embodiments, the CPU 140, northbridge 145, southbridge 150, GPU 125, or system RAM 155 may be a computer chip or a silicon-based computer chip, or may be part of a computer chip or a silicon-based computer chip. The various components of the computer system 100 may be operatively, electrically, or physically connected or linked with a bus 195 or more than one bus 195.

The computer system 100 may be connected to one or more display units 170, input devices 180, output devices 185, or peripheral devices 190. These elements may be internal or external to the computer system 100, and may be wired or wirelessly connected. The display units 170 may be internal or external monitors, television screens, handheld device displays, touchscreens, and the like. The input devices 180 may be any one of a keyboard, mouse, track-ball, stylus, mouse pad, mouse button, joystick, touchscreen, scanner or the like. The output devices 185 may be any one of a monitor, printer, plotter, copier, or other output device. The peripheral devices 190 may be any other device that can be coupled to a computer. Example peripheral devices 190 may include a CD/DVD drive capable of reading or writing to physical digital media, a USB device, Zip Drive, external hard drive, phone or broadband modem, router/gateway, access point or the like.

The GPU 125 and the CPU 140 may implement sets of architectural registers 198, 199, respectively. The architectural registers 198, 199 represent, at least partially, states of the CPU 140 or GPU 125 and can be used by instructions, e.g., instructions in programs written for execution by the computer system 100. Instructions executed by the computer system 100 may read or write the architectural registers 198, 199. As discussed herein, some embodiments of the GPU 125 or the CPU 140 implement a physical register file (not shown in FIG. 1) that includes physical registers (not shown FIG. 1) used to store the information associated with the architectural registers. Mapping tables (not shown in FIG. 1) may therefore be used to map the architectural registers to numbers indicating the actual physical registers. As discussed herein, the GPU 125 or the CPU 140 may also implement another mapping table that may be used to map a predetermined number of the architectural registers to physical registers that include previous (unmodified) values corresponding to values of the architectural registers prior to executing a transaction, thereby checkpointing the associated architectural register so that it may be rewritten into the appropriate physical register to return the state of the GPU 125 or the CPU 140 to a checkpointed state in the event that the transaction aborts.

Figure 2:
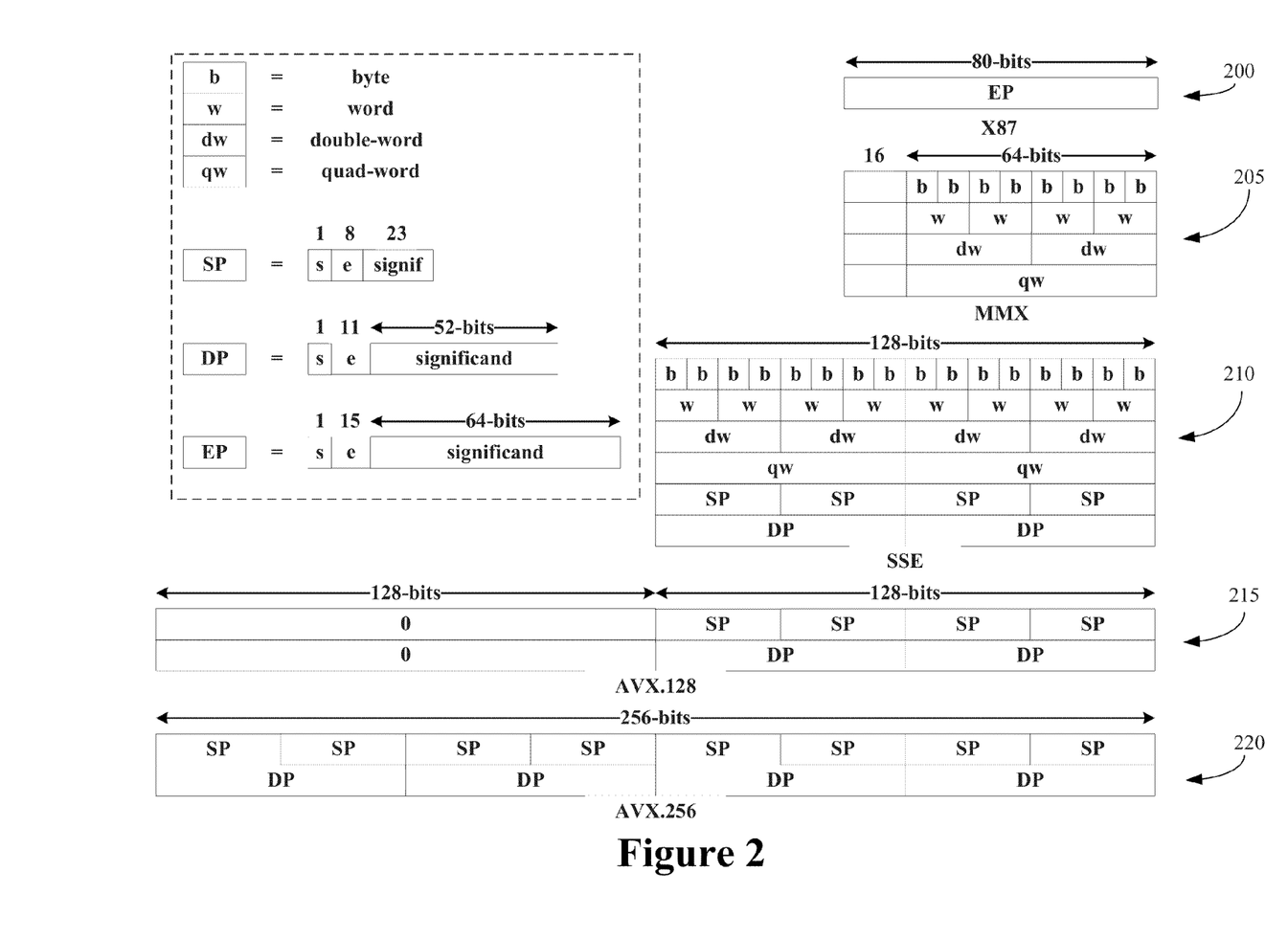
FIG. 2 conceptually illustrates architectural registers used by different instruction set architectures, according to some embodiments.

FIG. 2 conceptually illustrates architectural registers used by different instruction set architectures, according to some embodiments. An 80-bit architectural register 200 is used by the x87 instruction set. An alternative 80-bit architectural register 205 may be used by the MMX instruction set. The SSE instruction set extends the length of architectural registers to a 128-bit architectural register 210. The architectural registers 200, 205, 210 may be mapped to 128-bit physical registers. The AVX instruction set uses 256-bit architectural registers 215, 220 but the architectural register 215 defines 128 bits as 0 to support 128 bit instructions. The architectural registers 215, 220 may be mapped to two 128-bit physical registers.

Figure 3:
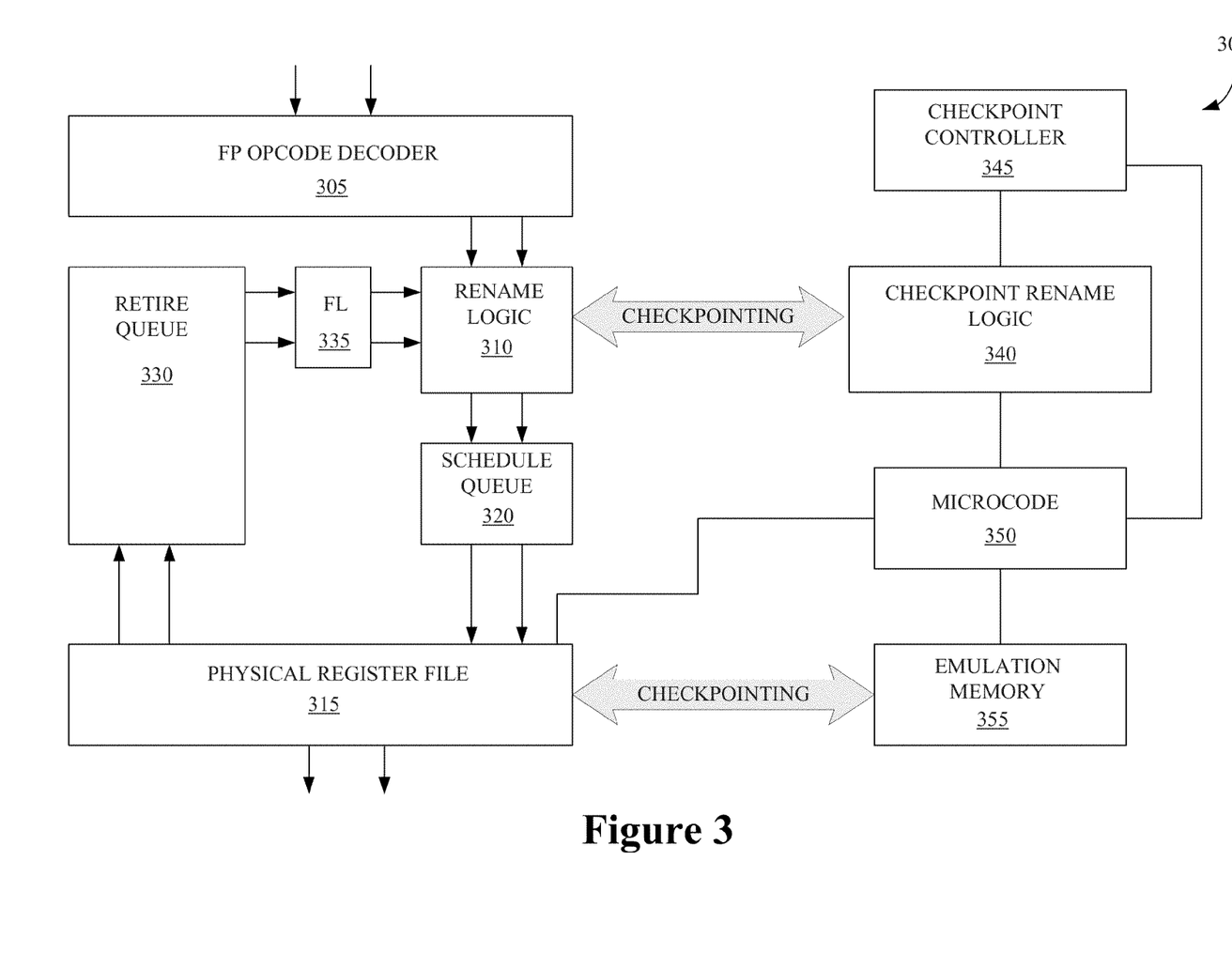
FIG. 3 conceptually illustrates an example of a portion of a processing device that may be implemented in the processing system shown in FIG. 1, according to some embodiments.

FIG. 3 conceptually illustrates an example of a portion of a processing device 300 that may be implemented in the GPU 125 or the CPU 140 shown in FIG. 1, according to some embodiments. The processing device 300 shown in FIG. 3 includes a floating-point unit and checkpointing logic. The state of the processing device 300 is represented, at least in part, by values associated with a set of architectural registers. For example, the instruction set architecture used by the processing device 300 may define 32 floating-point architectural registers that can be written to or read by instructions such as instructions in a transaction. Some embodiments of the processing device 300 may also include additional architectural registers such as 16 integer architectural registers that may be used (possibly in combination with the floating-point architectural registers) to define the state of the processing device 300. Persons of ordinary skill in the art having benefit of the present disclosure should appreciate that some of the embodiments described with reference to FIG. 3 may be applied to other sets of architectural registers including integer architectural registers or a set of architectural registers that includes both integer and floating-point architectural registers.

In some embodiments, the processing device 300 includes an instruction decoder 305 that is configured to decode incoming floating-point instructions that may be part of a transaction. As used herein, the term "instruction" may also encompass operations (or ops), micro-operations, opcodes, and the like. Instructions may be fetched from memory, e.g. RAM or DRAM such as the DRAM 155 depicted in FIG. 1 and then decoded by the floating-point opcode decoder 305 for subsequent execution. The processing device 300 also includes rename logic 310 that maps architectural registers to one or more physical registers in a physical register file 315. Transactions or instructions that reference one or more architectural registers can use the mapping indicated by the rename logic 310 to write to or read from the corresponding physical registers in the physical register file 315.

A schedule queue 320 may be used to schedule execution of instructions in the processing device 300. In some embodiments, the rename logic 310 provides information (such as a physical register number) indicating the identity of the physical register(s) allocated to architectural register(s) that are referenced by the transaction or instruction. The schedule queue 320 may therefore schedule reads or writes to the physical registers in the physical register file 315 and the results may be passed to other portions of the floating-point unit 300, e.g. for performing multiply or add operations on the source operands that were read from the physical register file 315.

The floating-point unit 300 also includes a retire queue 330 that stores instructions that are waiting to retire or are in the process of being retired. A free list (FL) 335 includes entries associated with the physical registers in the physical register file. In some embodiments, the physical register file 315 includes 72 physical registers and, therefore, the free list 335 may include up to 72 entries corresponding to these physical registers. Entries in the free list 335 indicate whether the corresponding physical register is "free" so that the physical register can be allocated to a decoded instruction, other in-flight operation, or used to checkpoint an architectural register, as discussed herein. The retire queue 330 can signal the free list 335 when an instruction has retired so that the physical registers currently mapped as the destination architectural register referenced by the retired instruction or checkpointed architectural register associated with the retired instruction can be freed for allocation to other instructions or operations, since the retired instruction maps a new physical register to that architectural register. The free list 335 may also communicate with the rename logic 310 so that the rename logic 310 knows when a physical register has been freed for allocation to an architectural register.

As discussed herein, instructions within a transaction are executed in an atomic and isolated way. Instructions in an atomic transaction are executed as a block with respect to all other concurrent execution threads. The instructions in a transaction are isolated so that intermediate results produced by the transaction are not exposed to the rest of the system until the transaction completes. Values stored in physical registers associated with the architectural registers may therefore be changed by instructions in the transaction before the values are committed following completion of the transaction. If the transaction fails to complete for any reason, such as an abort of the transaction, some embodiments of the processing device 300 roll back the state of the processing device 300 to a checkpointed state by writing values that were associated with the architectural register prior to initiating the transaction into the appropriate physical registers in the physical register file 315.

The processing device 300 may therefore checkpoint values of registers using a checkpoint rename logic 340. Some embodiments of the checkpoint rename logic 340 can be configured to map a predetermined number of architectural registers to corresponding physical registers in the physical register file 315 that hold previous values of the architectural registers. For example, the checkpoint rename logic 340 may be configured to map eight architectural registers to corresponding physical registers. Checkpointing using the checkpoint rename logic 340 can be performed in response to a transaction modifying one or more values of one or more architectural registers. For example, the checkpoint rename logic 340 can modify an entry in a table that indicates a mapping of the modified architectural register to a physical register that includes the value of the architectural register prior to beginning the transaction or prior to modification of the value of the architectural register. The rename logic 310 is also modified to indicate a mapping of the architectural register to a physical register that includes the modified value of the architectural register. Thus, a checkpointed architectural register may be mapped to two physical registers in the physical register file 315: one physical register indicated by the rename logic 310 that includes a current value of the architectural register and another physical register indicated by the checkpoint rename logic 340 that includes a prior, checkpointed value of the architectural register.

Instructions in the transaction may modify more than the predetermined number of architectural registers that can be checkpointed using the checkpoint rename logic 340. The processing device 300 may therefore include a checkpoint controller 345 that monitors the number of architectural registers that have been modified by a transaction. If the checkpoint controller 345 detects a modification that causes the number of modified architectural registers to exceed the number of architectural registers that can be mapped by the checkpoint rename logic 340, the checkpoint controller 345 may instruct the microcode 350 to write or copy checkpointed values in the physical registers to another memory such as an emulation memory 355. Some embodiments of the checkpoint controller 345 may also instruct the checkpoint rename logic 340 to clear its current mapping and free the physical registers used to hold the checkpointed values.

Some embodiments of the processing device 300 may subsequently use the checkpoint rename logic 340 to checkpoint additional architectural registers that may be modified by the transaction after writing the previous set of physical registers to the emulation memory 355. In that case, checkpointing may proceed by modifying entries in the checkpoint rename logic 340 to indicate a mapping of modified architectural registers to physical registers in the physical register file 315. The contents of the physical registers used to checkpoint the architectural registers may be written or copied to the emulation memory 355 when the number of modified architectural registers exceeds the size of the checkpoint rename logic 340.

Some embodiments of the processing device 300 may write or copy the entire set of initial values of the architectural registers (e.g., the values prior to beginning the transaction) in response to the number of modified architectural registers exceeding the number of architectural registers that can be mapped by the checkpoint rename logic 340. From this point on, the processing device 300 may not need to use the checkpoint rename logic 340 for any additional checkpointing because the initial state of the processing device 300 indicated by the complete set of architectural registers has been written to the emulation memory 355. The processing device 300 can therefore be rolled back to its state prior to beginning the transaction using the values of the architectural registers stored in the emulation memory 355. Some embodiments of the processing device 300 may combine the aforementioned embodiments and may write or copy the entire set of initial values after the checkpoint rename logic 340 has been "filled" a predetermined number of times.

Figure 4:
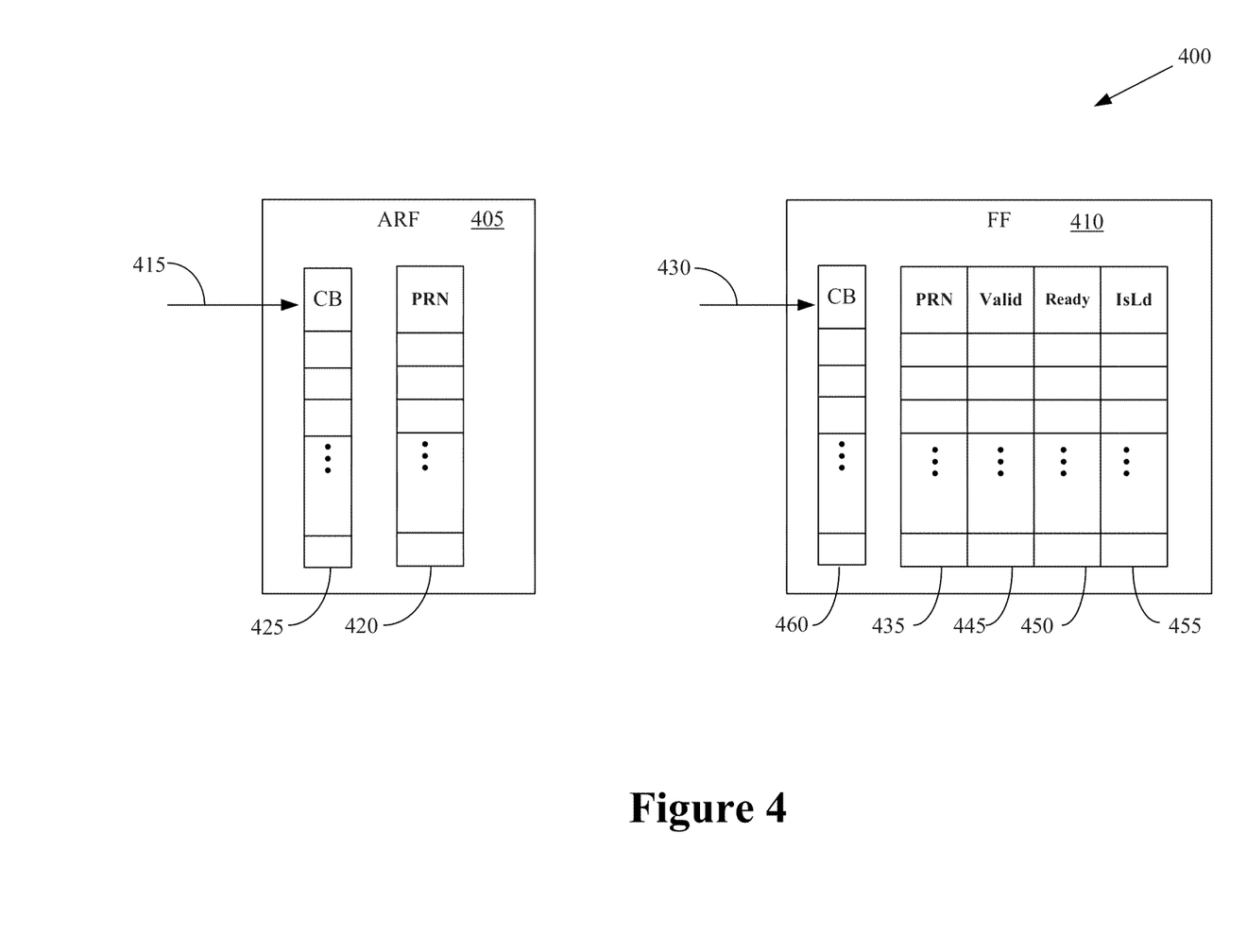
FIG. 4 conceptually illustrates an example of rename logic that may be implemented as the rename logic shown in FIG. 3, according to some embodiments.

FIG. 4 conceptually illustrates an example of rename logic 400 that may be implemented as the rename logic 310 shown in FIG. 3, according to some embodiments. The rename logic 400 shown in FIG. 4 includes an architectural register file (ARF) 405 that maps architectural registers (0-47) to physical registers and a future file (FF) 410 that maps speculative values of architectural registers (0-47) to physical registers. The ARF 405 comprises a retire-time, non-speculative map table and the FF 410 comprises a dispatch-time (speculative) map table.

In some embodiments, the ARF 405 includes an array 420 that includes information indicating the physical register number (PRN) of the physical register that is mapped to the corresponding architectural register. When a physical register has been allocated to an architectural register, the physical register number identifying the allocated physical register is stored in the corresponding entry in the array 420. Architectural register numbers may be used as an index 415 into the array 420 to identify the PRN associated with the architectural register. Some embodiments of the ARF 405 include an array 425 of checkpoint bits (CB) that are used to indicate previously checkpointed registers. Each bit in the array 425 is associated with an architectural register and can be set (e.g., given a value of 1) to indicate that the corresponding architectural register has been checkpointed. For example, an architectural register that has a set value of the checkpoint bit may have been checkpointed in rename logic or may have been saved to a private memory. Checkpointed architectural registers do not need to be re-checkpointed. Checkpoint rename logic such as the logic 340 shown in FIG. 3 may use the array 425 to determine whether architectural registers have already been checkpointed before performing checkpointing of the architectural registers, thereby avoiding unnecessary re-checkpointing of previously checkpointed architectural registers.

The FF 410 also includes an array 435 that includes information indicating the physical register number (PRN) of the physical register mapped to the architectural register. Architectural register numbers may be used as an index 430 into the array 420 to identify the PRN associated with the architectural register. In some embodiments, the FF 410 also includes an array 445 of valid bits, an array 450 of ready bits, and an array 455 of IsLd bits. The arrays 445, 450, 455 may be used to track whether the physical register that is mapped to the corresponding architectural register is "ready" (e.g., whether the operation that produces its data has completed or not) at dispatch. When a physical register has been allocated to an architectural register in response to decoding a speculative instruction, the physical register number identifying the allocated physical register is stored in the corresponding entry in the array 430. Some embodiments of the FRF 410 include an array 460 of checkpoint bits (CB) that are used to indicate previously checkpointed registers. Each bit in the array 460 is associated with an architectural register and can be set (e.g., given a value of 1) to indicate that the corresponding architectural register has been checkpointed. Checkpoint rename logic such as the logic 340 shown in FIG. 3 may use the array 425 to determine whether architectural registers have already been checkpointed, as discussed herein.

Figure 5A:
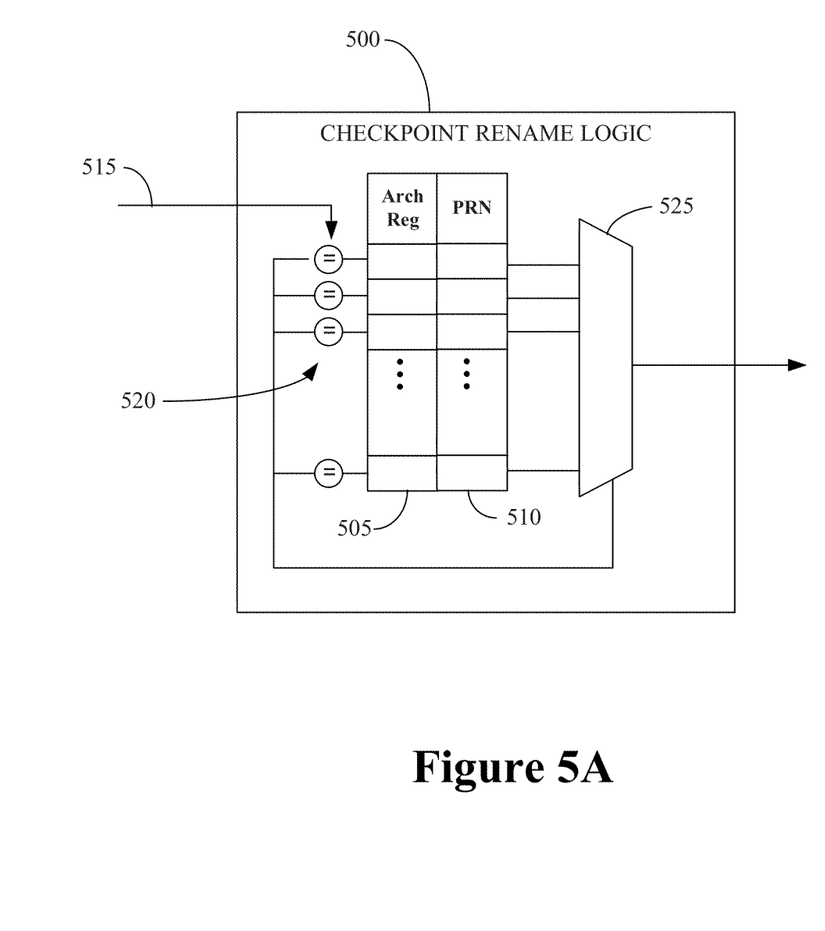
FIG. 5A conceptually illustrates an example of checkpoint rename logic such as the checkpoint rename logic shown in FIG. 3, according to some embodiments.

FIG. 5A conceptually illustrates an example of checkpoint rename logic 500, according to some embodiments. The checkpoint rename logic 500 may be implemented in some embodiments of the checkpoint rename logic 340 shown in FIG. 3. The checkpoint rename logic 500 is used to checkpoint values of architectural registers that may be indicated in an architectural register file such as the ARF 405 shown in FIG. 4. The checkpoint rename logic 500 includes an array 505 that can be used to store information indicating the checkpointed architectural registers and an array 510 that can be used to store information indicating the physical register number (PRN) of the physical register that is mapped to the corresponding checkpointed architectural register. Some embodiments of the checkpoint rename logic 500 may be implemented as content-addressable memory. For example, the checkpoint rename logic 500 may receive an input architectural register number (ARN) 515 that can be compared to values in the architectural register array 505 using comparators 520. The results of the comparison (e.g., the "match" bits) may be used as the select input to a multiplexer 525 that is coupled to the array 510. The select bits can be used to select and read out the PRN corresponding to the input ARN. As discussed herein, some embodiments of the checkpoint rename logic 500 may use arrays of checkpoint bits (such as the arrays 425, 460 shown in FIG. 4) to determine whether architectural registers have been previously checkpointed.

Figure 5B:
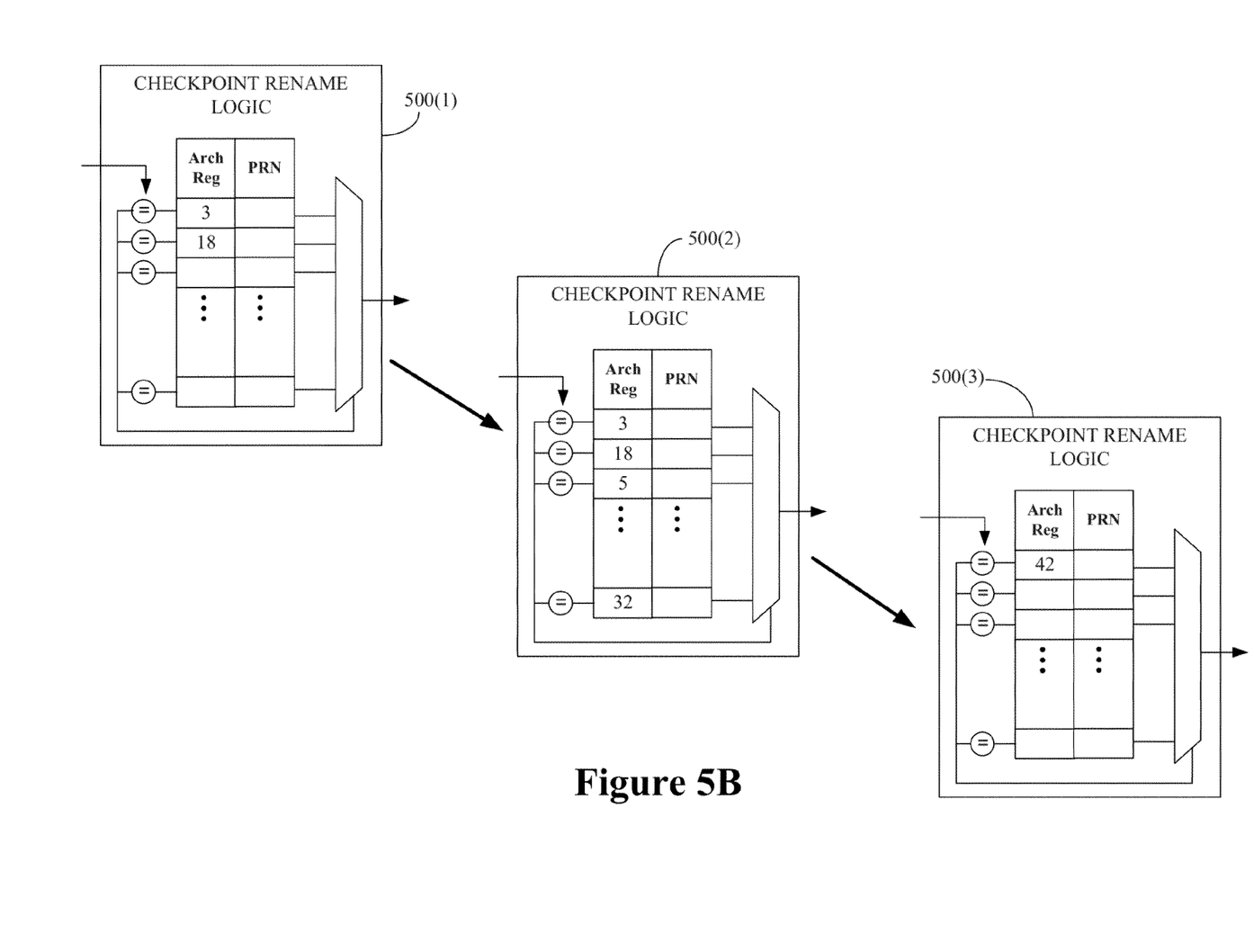
FIG. 5B conceptually illustrates an example of the checkpoint rename logic at three different stages during execution of a transaction, according to some embodiments.

FIG. 5B conceptually illustrates the checkpoint rename logic 500 at three different stages during execution of a transaction, according to some embodiments. In the first state shown in FIG. 5B, the checkpoint rename logic 500(1) is used to checkpoint two architectural registers (3, 18) that have been modified by instructions in a transaction. Entries in the architectural register array of the checkpoint rename logic 500(1) are associated with corresponding values of the PRN in the array 510(1). The values in the PRN array indicate locations of the physical registers in a corresponding physical register file that include the checkpointed values of the architectural registers, e.g., the values of these registers prior to beginning the transaction. An input ARN may then be compared to the values (3, 18) of the checkpointed architectural registers and the corresponding PRN can be muxed out, as discussed herein.

In the second state shown in FIG. 5B, the checkpoint rename logic 500(2) is used to checkpoint the maximum number of architectural registers supported by the checkpoint rename logic 500(2). For example, the checkpoint rename logic 500(2) may be configured to map up to eight architectural registers to physical registers that include the checkpointed values of the architectural registers. The entries in the architectural register array 505(2) therefore link eight architectural registers (3, 18, 5, . . . 32) to corresponding physical registers indicated by the PRN array 510(2). If instructions in the transaction modify any additional architectural registers, the values of the architectural registers that are checkpointed by the checkpoint rename logic 500(2) may be written to a private memory or an emulation memory. In some embodiments, the checkpoint rename logic 500(2) may subsequently be cleared so that additional architectural registers can be checkpointed using the checkpoint rename logic 500(2). In some embodiments, the complete architectural register set of the corresponding device may be written to the private memory or emulation memory, as discussed herein.

In the third state shown in FIG. 5B, the checkpoint rename logic 500(3) is used to checkpoint an architectural register (42) that has been modified by instructions in the transaction after the previous set of checkpointed values of the architectural registers have been written to the private or emulation memory. The third state of the checkpoint rename logic 500 (3) therefore corresponds to an embodiments in which the complete set of architectural registers has not been written to the private memory or emulation memory in response to filling the checkpoint rename logic 500(2).

Figure 6:
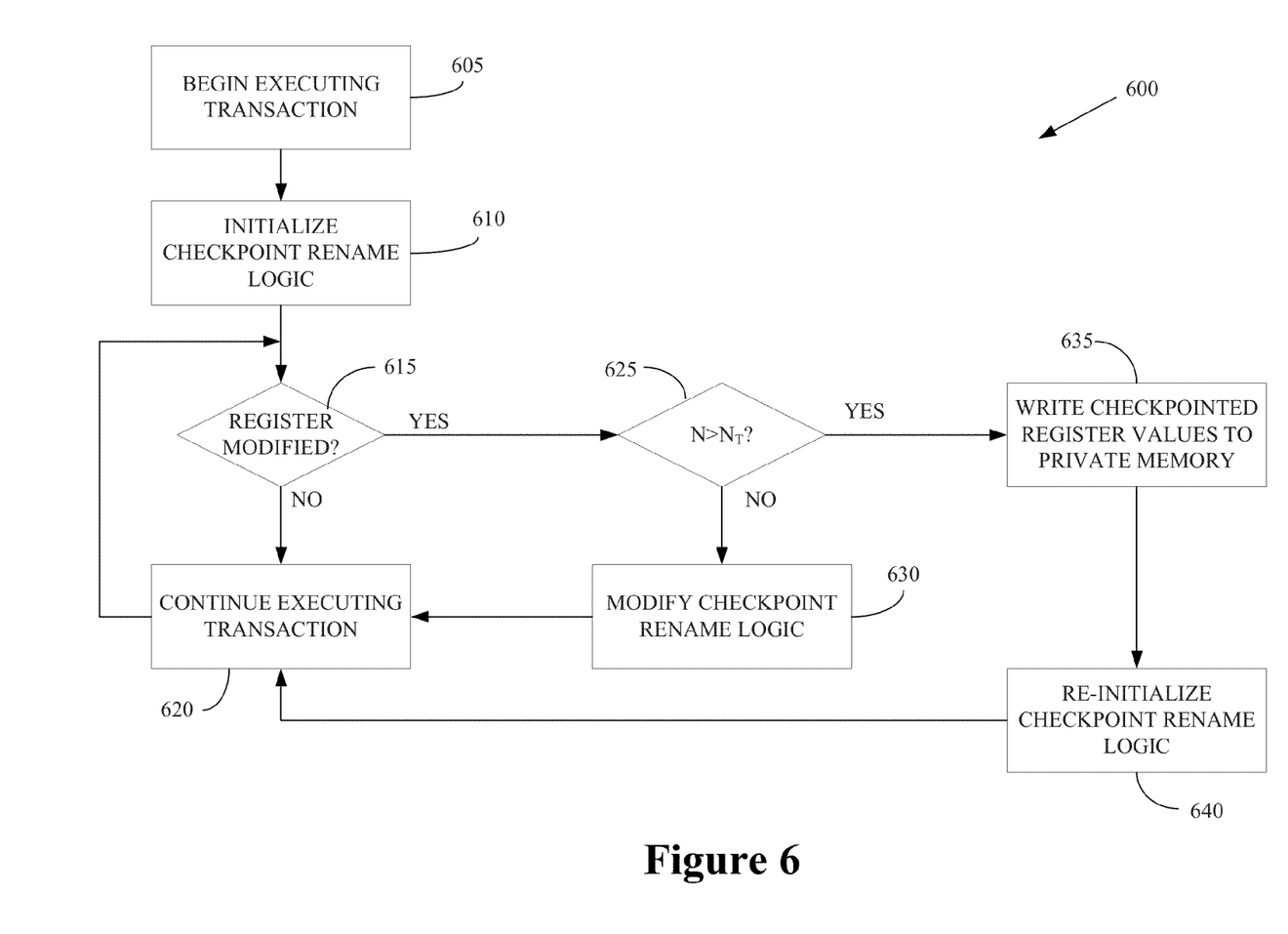
FIG. 6 shows an example of a method for checkpointing architectural registers for transactional memory, in accordance with some embodiments.

FIG. 6 shows an example of a method 600 for checkpointing architectural registers for transactional memory, in accordance with some embodiments. A processing device such as the processing devices 100, 300 shown in FIGS. 1 and 3 begins (at 605) executing a transaction that includes one or more instructions. The processing device may then initialize (at 610) checkpoint rename logic such as the checkpoint rename logic 340 or 500 shown in FIGS. 3 and 5. Initializing (at 610) the checkpoint rename logic may include clearing arrays that are used to store information identifying architectural registers or associated physical registers, as well as clearing any associations or pointers between the arrays. The processing device then monitors operation to determine whether one or more of the architectural registers has been modified (at 615). Some embodiments of the processor device include a controller such as the checkpoint controller 345 shown in FIG. 3 that can monitor (at 615) states of the architectural registers. As long as none of the architectural registers have been modified (at 615) by instructions in the transaction, the processing device continues (at 620) executing instructions in the transaction.

If the controller detects (at 615) that an instruction in the transaction has modified one or more architectural registers, the controller determines (at 625) whether the number (N) of architectural registers that has been modified by this instruction or a previous instruction exceeds a threshold value ($N_T$). For example, the threshold value ($N_T$) may correspond to the number of entries implemented in the arrays of the checkpoint rename logic. Since the checkpoint rename logic can map up to the threshold value ($N_T$) of architectural registers to checkpointed values stored in physical registers, the checkpoint rename logic may be modified (at 630) to add an entry that maps the modified architectural register to a physical register that includes the checkpointed value of the architectural register. The processing device may then continue (at 620) executing instructions in the transaction.

If the controller determines (at 625) that the number of architectural registers that have been modified exceeds the threshold value ($N_T$), the controller may cause the checkpointed register values to be written (at 635) from the physical registers to a private memory. For example, microcode may be invoked to write (at 635) the checkpointed register values to the private memory. Some embodiments of the processing device that implements the method 600 may be configured to continue to use the checkpoint rename logic to map additional architectural registers to physical registers after checkpointed values stored in a previous set of physical registers have been written (at 635) to the private memory. The method 600 may therefore re-initialize (at 640) the checkpoint rename logic and continue (at 620) executing the transaction. Subsequent modifications (at 615) may result in updating the checkpoint rename logic. Some embodiments of the method 600 may be iterated indefinitely or for a predetermined number of iterations before checkpointing of the complete set of architectural registers is triggered, as discussed herein.

Figure 7:
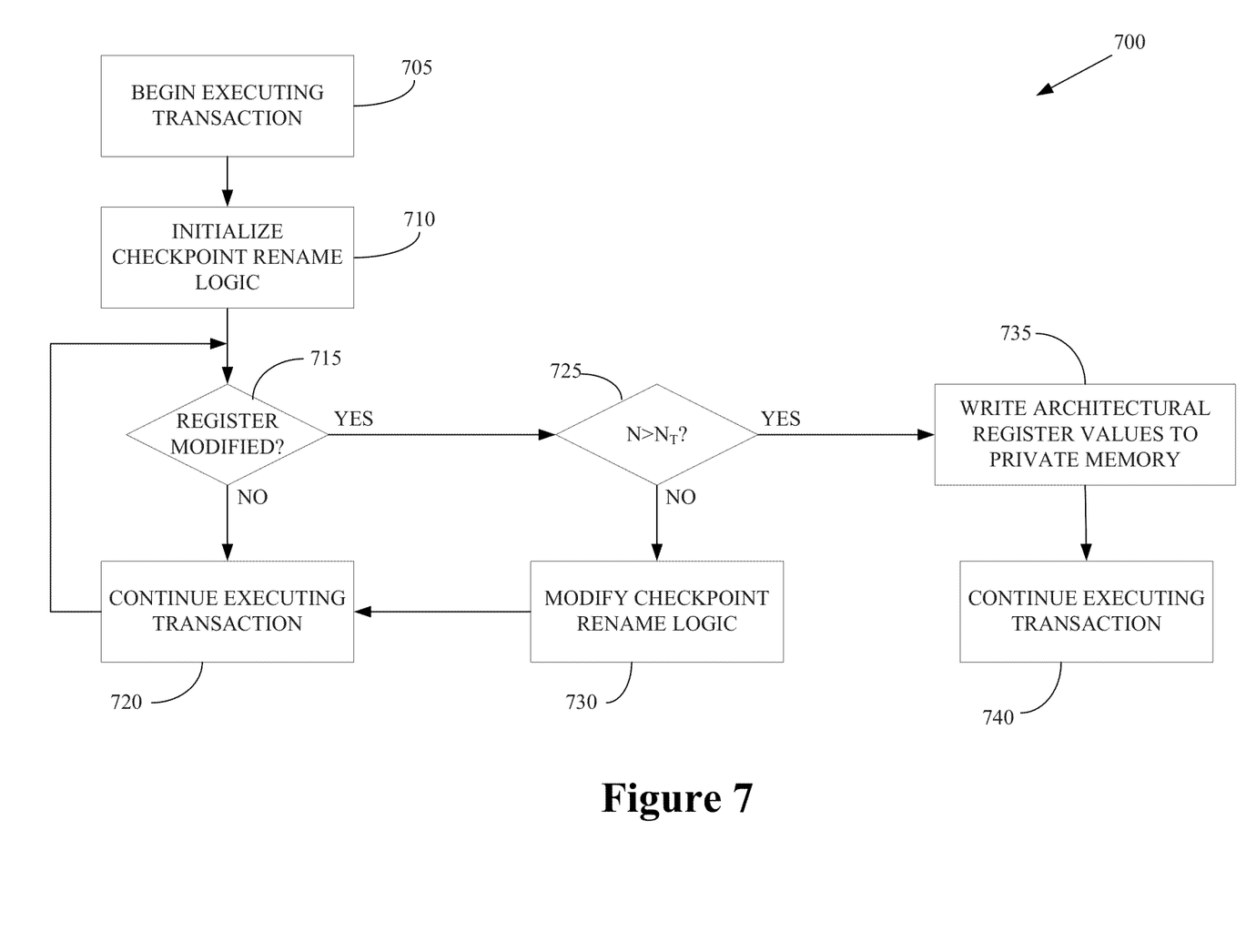
FIG. 7 shows an example of a method for checkpointing architectural registers for transactional memory, in accordance with some embodiments.

FIG. 7 shows an example of a method 700 for checkpointing architectural registers for transactional memory, in accordance with some embodiments. A processing device such as the processing devices 100, 300 shown in FIGS. 1 and 3 begins (at 705) executing a transaction that includes one or more instructions. The processing device may then initialize (at 710) checkpoint rename logic such as the checkpoint rename logic 340 or 500 shown in FIGS. 3 and 5. The processing device then monitors operation to determine whether one or more of the architectural registers has been modified (at 715). Some embodiments of the processor device include a controller such as the checkpoint controller 345 shown in FIG. 3 that can monitor (at 715) states of the architectural registers. As long as none of the architectural registers have been modified (at 715) by instructions in the transaction, the processing device continues (at 720) executing instructions in the transaction.

If the controller detects (at 715) that an instruction in the transaction has modified one or more architectural registers, the controller determines (at 725) whether the number (N) of architectural registers that has been modified by this instruction or a previous instruction exceeds a threshold value ($N_T$). For example, the threshold value ($N_T$) may correspond to the number of entries implemented in the arrays of the checkpoint rename logic. Since the checkpoint rename logic can map up to the threshold value ($N_T$) of architectural registers to checkpointed values stored in physical registers, the checkpoint rename logic may be modified (at 730) to add an entry that maps the modified architectural register to a physical register that includes the checkpointed value of the architectural register. The processing device may then continue (at 720) executing instructions in the transaction.

If the controller determines (at 725) that the number of architectural registers that have been modified exceeds the threshold value ($N_T$), the controller may cause a selected number of architectural register values to be written (at 735) to a private memory. Some embodiments of the method 700 may write (at 735) checkpointed values for a complete set of architectural registers in the processing device to the private memory. For example, microcode may be invoked to write (at 735) values stored in physical registers that are mapped to the architectural register (e.g., by the rename logic or checkpoint rename logic) to the private memory. The processing device may then continue (at 740) executing instructions in the transaction. As discussed herein, some embodiments of the processing device may implement the method 700 in combination with embodiments of the method 600.

Figure 8:
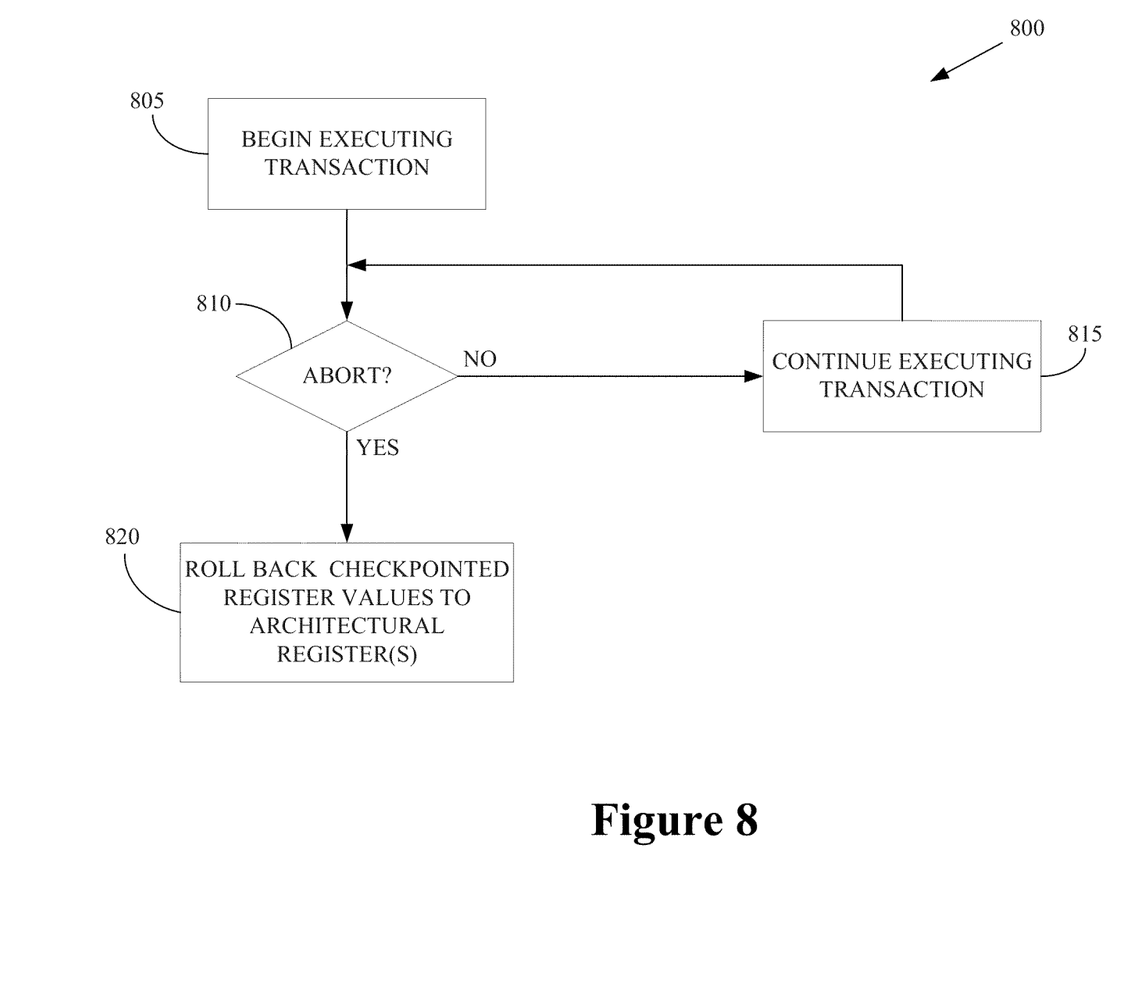
FIG. 8 shows an example of a method for rolling back the state of a processing device to a previous state using checkpointed values of architectural registers, in accordance with some embodiments.

FIG. 8 shows an example of a method 800 for rolling back the state of a processing device to a previous state using checkpointed values of architectural registers, in accordance with some embodiments. A processing device such as the processing devices 100, 300 shown in FIGS. 1 and 3 begins (at 805) executing a transaction that includes one or more instructions. As long as the instructions in the transaction are being executed (at 810) normally the processing device continues (at 815) executing the instructions in the transaction. The processing device may also be checkpointing values of the architectural registers concurrently with executing the transaction, in accordance with some embodiments described herein. If the processing device determines (at 810) that the transaction failed to complete successfully, e.g., the transaction has been aborted (at 810), the processing device may roll back (at 820) its state to the state prior to initiating the transaction. For example, checkpointed values of the physical registers and architectural registers may be written (at 820) back to the ARF or FF, such as the ARF 405 or the FF 410 in FIG. 4. For example, checkpointed values of PRNs stored in a checkpoint table maintained by rename logic such as the checkpoint rename logic 340 shown in FIG. 3 may be written back to the ARF or FF using hardware. The hardware may include logic that is configured to read out the ARN and PRN value and write the PRN value to the correct location in the ARF or FF. Restoration of the checkpointed values of the physical registers may be used in embodiments that checkpoint some or all of the registers to private memory as long as some of the checkpointed registers have been checkpointed in the rename logic, as discussed herein. Some embodiments may write (at 820) checkpointed values from the private memory to the ARF or FF. For example, a transaction abort microcode routine may read the checkpointed values back into the appropriate registers in the ARF or FF. Some embodiments of the private memory area may be configured to include "locations" for each ARN and a bitvector (similar to the "checkpointed" bits in the ARF) that includes bits that can be set to tell the microcode which registers are "valid" in those locations. Microcode may then read those values back into the corresponding registers.

Embodiments of processor systems that can checkpoint registers for transactional memory as described herein (such as the processor system 100) can be fabricated in semiconductor fabrication facilities according to various processor designs. In one embodiment, a processor design can be represented as code stored on a computer readable media. Exemplary codes that may be used to define and/or represent the processor design may include HDL, Verilog, and the like. The code may be written by engineers, synthesized by other processing devices, and used to generate an intermediate representation of the processor design, e.g., netlists, GDSII data and the like. The intermediate representation can be stored on computer readable media and used to configure and control a manufacturing/fabrication process that is performed in a semiconductor fabrication facility. The semiconductor fabrication facility may include processing tools for performing deposition, photolithography, etching, polishing/planarizing, metrology, and other processes that are used to form transistors and other circuitry on semiconductor substrates. The processing tools can be configured and are operated using the intermediate representation, e.g., through the use of mask works generated from GDSII data.

Portions of the disclosed subject matter and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the disclosed subject matter are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The disclosed subject matter is not limited by these aspects of any given implementation.

Furthermore, the methods disclosed herein may be governed by instructions that are stored in a non-transitory computer readable storage medium and that are executed by at least one processor of a computer system. Each of the operations of the methods may correspond to instructions stored in a non-transitory computer memory or computer readable storage medium. In various embodiments, the non-transitory computer readable storage medium includes a magnetic or optical disk storage device, solid state storage devices such as Flash memory, or other non-volatile memory device or devices. The computer readable instructions stored on the non-transitory computer readable storage medium may be in source code, assembly language code, object code, or other instruction format that is interpreted and/or executable by one or more processors.

The particular embodiments disclosed above are illustrative only, as the disclosed subject matter may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed:

1. An apparatus, comprising:
    first rename logic configured to map up to a predetermined number of architectural registers to corresponding first physical registers that hold first values associated with the architectural registers, wherein the mapping is responsive to a transaction modifying at least one of the first values associated with the architectural registers;
    second rename logic configured to map the architectural registers to second physical registers that hold second values of the architectural registers, wherein the first values are values associated with the corresponding architectural register prior to modification by the transaction and the second values are values associated with the corresponding architectural register following modification by the transaction; and
    microcode configured to write contents of the first physical registers to a memory in response to the transaction modifying first values associated with a number of the architectural registers that is larger than the predetermined number, and wherein the predetermined number is equal to a number of entries in the first rename logic.

2. The apparatus of claim 1, further comprising a controller configured to monitor the number of the architectural registers modified by the transaction.

3. The apparatus of claim 2, wherein the controller is configured to cause the microcode to write contents of the first physical registers to the memory in response to the number exceeding the predetermined number.

4. The apparatus of claim 3, wherein the controller is configured to cause the microcode to free the first physical registers in response to writing contents of the first physical registers to the memory.

5. The apparatus of claim 4, wherein the first rename logic is configured to map up to the predetermined number of additional architectural registers to the first physical registers in response to the transaction modifying at least one of the first values associated with the additional architectural registers after the microcode frees the first physical registers in response to writing contents of the first physical registers to the memory.

6. The apparatus of claim 2, wherein the controller is configured to cause the microcode to write values associated with a predetermined set of architectural registers to the memory in response to the number exceeding the predetermined number.

7. The apparatus of claim 6, wherein the predetermined set of architectural registers comprises all architectural registers defined for the apparatus.

8. The apparatus of claim 6, wherein the controller is configured to cause the microcode to free the first physical registers in response to writing values of all of the architectural registers to the memory.

9. The apparatus of claim 1, wherein the controller is configured to detect an abort of the transaction and to cause the microcode to write contents of at least one of the first physical registers or the memory to at least one of the second physical registers in response to detecting the abort of the transaction.

10. A method, comprising:
mapping, using a first rename logic, up to a predetermined number of architectural registers to corresponding first physical registers that hold first values associated with the architectural registers, wherein the mapping is responsive to a transaction modifying at least one of the first values associated with the architectural registers;
mapping, using a second rename logic, the architectural registers to second physical registers that hold second values of the architectural registers, wherein the first values are values associated with the corresponding architectural register prior to modification by the transaction and the second values are values associated with the corresponding architectural register following modification by the transaction; and
writing contents of the first physical registers to a memory in response to the transaction modifying first values associated with a number of the architectural registers that is larger than the predetermined number, wherein the predetermined number is equal to a number of entries in the first rename logic.

11. The method of claim 10, further comprising monitoring the number of the architectural registers modified by the transaction.

12. The method of claim 11, further comprising writing contents of the first physical registers to the memory in response to the number exceeding the predetermined number.

13. The method of claim 12, further comprising freeing the first physical registers in response to writing contents of the first physical registers to the memory.

14. The method of claim 13, further comprising mapping up to the predetermined number of additional architectural registers to the first physical registers in response to the transaction modifying at least one of the first values associated with the additional architectural registers after the microcode frees the first physical registers in response to writing contents of the first physical registers to the memory.

15. The method of claim 11, further comprising writing values associated with a predetermined set of architectural registers to the memory in response to the number exceeding the predetermined number.

16. The method of claim 15, further wherein the predetermined set of architectural registers comprises all architectural registers used to define a state of a processing device.

17. The method of claim 15, further comprising freeing the first physical registers in response to writing values of all of the architectural registers to the memory.

18. The method of claim 10, further comprising detecting an abort of the transaction and writing contents of at least one of the first physical registers or the memory to at least one of the second physical registers in response to detecting the abort of the transaction.

19. A non-transitory computer readable media including instructions that when executed can configure a manufacturing process used to manufacture a semiconductor device comprising:
first rename logic configured to map up to a predetermined number of architectural registers to corresponding first physical registers that hold first values associated with the architectural registers, wherein the mapping is responsive to a transaction modifying at least one of the first values associated with the architectural registers;
second rename logic configured to map the architectural registers to second physical registers that hold second values of the architectural registers, wherein the first values are values associated with the corresponding architectural register prior to modification by the transaction and the second values are values associated with the corresponding architectural register following modification by the transaction; and
microcode configured to write contents of the first physical registers to a memory in response to the transaction modifying first values associated with a number of the architectural registers that is larger than the predetermined number, wherein the predetermined number is equal to a number of entries in the first rename logic.

20. The non-transitory computer readable media set forth in claim 19, further comprising instructions that when executed can configure the manufacturing process used in manufacturing the semiconductor device comprising a controller configured to monitor the number of the architectural registers modified by the transaction and to cause the microcode to write contents of the first physical registers to the memory in response to the number exceeding the predetermined number.

* * * * *